June 27, 1967  M. N. TODD, JR  3,328,595

DUAL BEAM OPTICAL GYROSCOPE PICKOFF

Filed Aug. 24, 1964  3 Sheets-Sheet 1

Marion N. Todd, Jr.
*INVENTOR.*

BY Harry M. Saragovitz
Edward J. Kelly
Herbert Berl
Howard H. Garner, Jr.

*ATTORNEYS*

Marion N. Todd, Jr.
*INVENTOR.*

Marion N. Todd, Jr.
INVENTOR.

United States Patent Office 3,328,595
Patented June 27, 1967

3,328,595
DUAL BEAM OPTICAL GYROSCOPE PICKOFF
Marion N. Todd, Jr., Santa Monica, Calif., assignor, by mesne assignments, to the United States of America as represented by the Secretary of the Army
Filed Aug. 24, 1964, Ser. No. 391,814
3 Claims. (Cl. 250—231)

ABSTRACT OF THE DISCLOSURE

Mechanism for providing a continuous reading of the angle between the spin axis of a rotating body and two reference directions so that the direction of the spin axis is known at all times. The mechanism includes a single source of light which generates two beams of light directed on a reticle surface of the spinning body. The reticle surface includes a segment defined as a revolution of a circular segment about the spin axis and having two zones of varying reflectivity girding the spinning body. Optical and detecting means are spaced at points circumferentially about the body to direct the light sources thereon and to receive the reflected light. The detector converts the reflected light into an electrical signal in response to the intensity of the reflected light. The segmental surface permits readings in both the pitch and yaw reference planes.

---

The invention described herein may be manufactured and used by or for the United States Government for governmental purposes without the payment of any royalty thereon.

The invention relates to a resolver system intended for use with spinning devices such as gyros where interactions such as friction, electrical field distortion or magnetic field distortion between the resolver and the spinning device is undesirable.

Prior art resolver systems have been generally of three types, namely, (1) magnetic, (2) shaft position incoders, (3) slide wire potentiometers. Each of these systems have disadvantages which make their use undesirable. For example, magnetic resolver systems interact with motor fields which causes erroneous readings. Furthermore, they are generally expensive, bulky and must be attached to the gimbal axis. Shaft positions incoder systems are limited in angle resolution, i.e. digital output, and are also bulky and must be attached to the gimbal shafts. This type of system requires a very sophisticated readout device and friction is prohibitive for high acceleration ratios. The slide wire potentiometers produce an excessive amount of friction, are either large or very complex, and also must be mounted on the gimbal shaft.

Accordingly, it is an object of the present invention to provide an electro-optical resolver system which avoids all friction-producing physical contact with the spinning body whose angle of the axis of rotation is being measured.

It is another object of the invention to provide an electro-optical resolver system which will measure the relative angular position of the axis of rotation of any spinning body in both the pitch and yaw directions.

Figure 2:
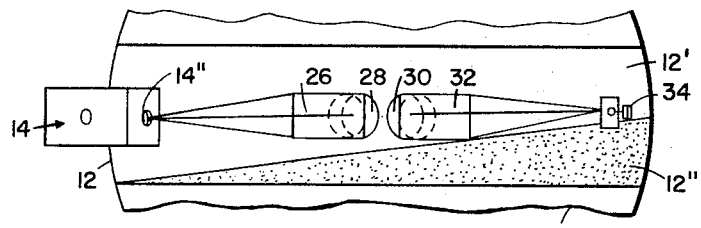
Figure 1:
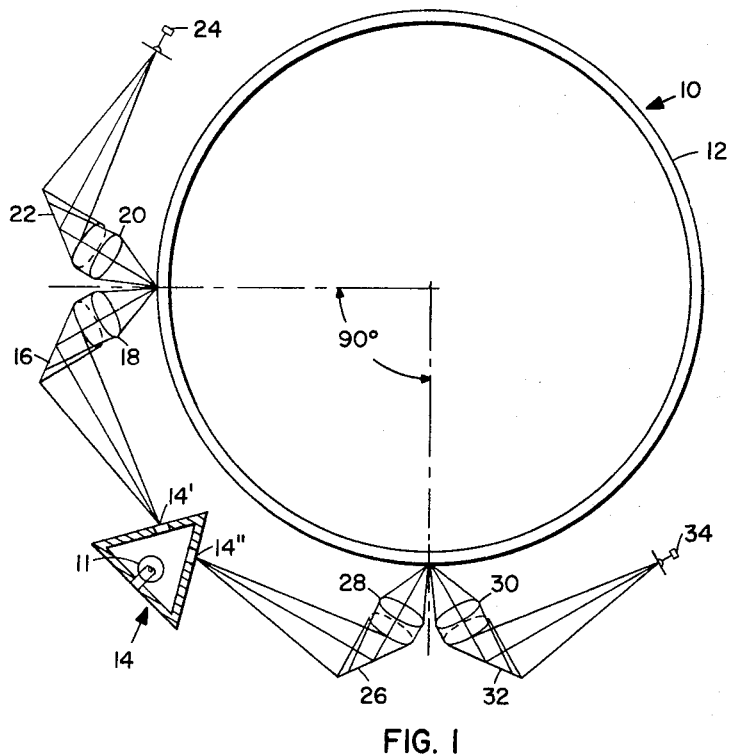
Figure 3:
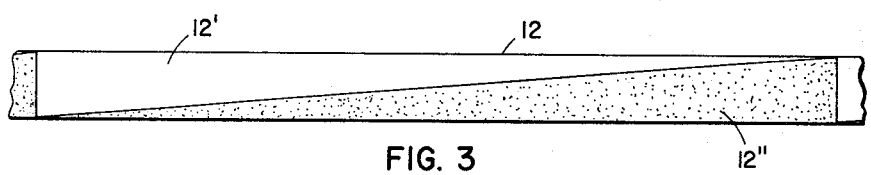
Figure 5A:
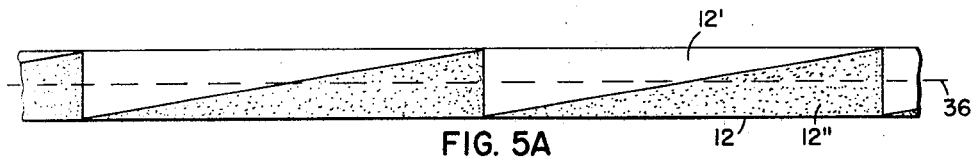
Figure 5B:
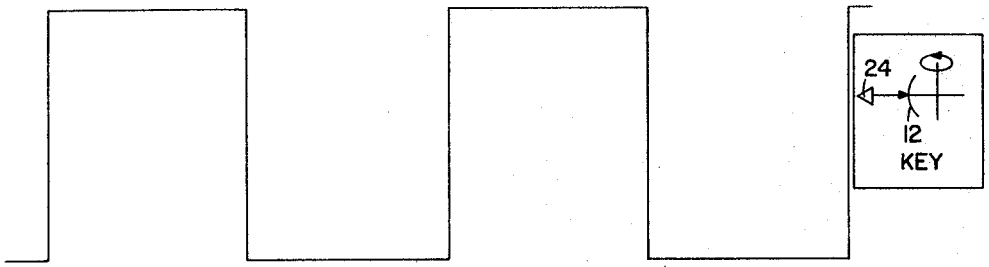
Figure 4A:
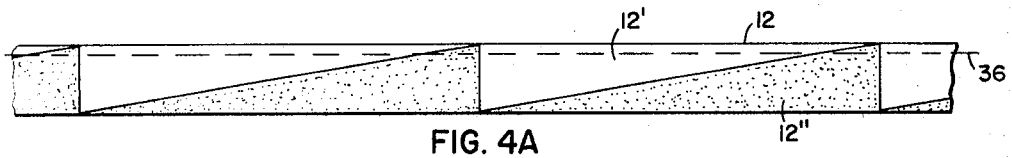
Figure 4B:
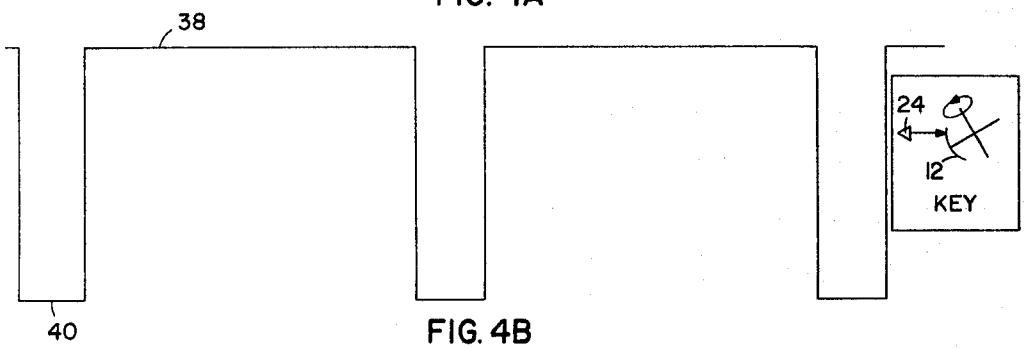
Figure 6A:
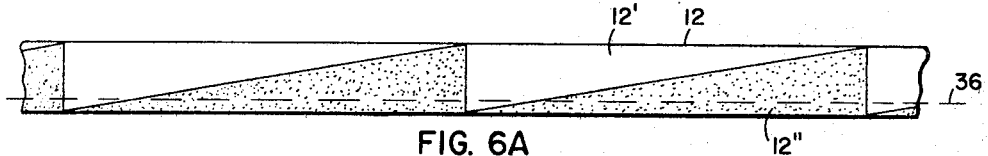
Figure 6B:
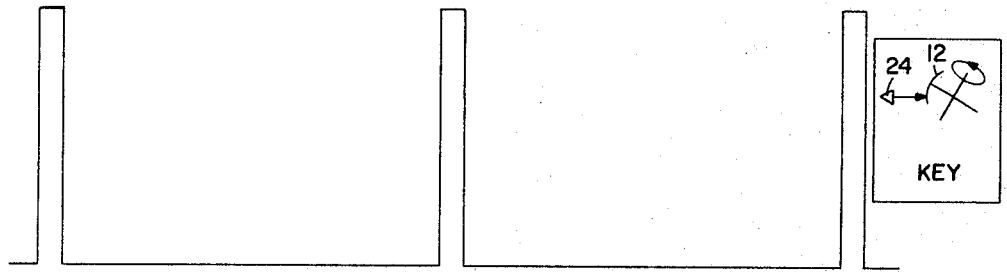
Figure 7:
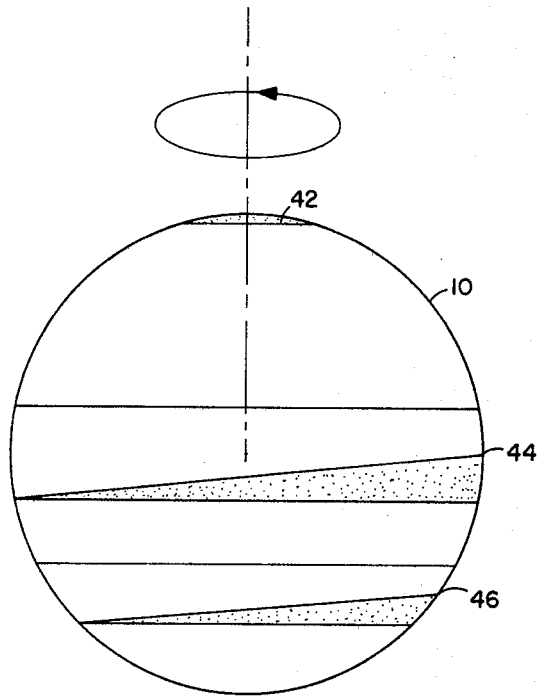

The foregoing and other objects of this invention as will become more fully apparent, infra, are accomplished by the utilization of a small light source which generates two beams of light, appropriate optics for directing and concentrating each of said light beams onto a reticle surface area having two zones of varying reflectivity girding a spinning body, at points spaced circumferentially thereabout, appropriate optical means for collecting, concentrating and directing light reflected by said reticle onto photo-electric detector cells which measure the intensity of the light reflected and transmits an electrical signal in response to the intensity of the reflected light to a simple electronic measuring circuit. Each of the above elements and their functions will be described with more particularity in the following detailed description of the accompanying drawings in which:

FIGURE 1 is a diagrammatic plan view of the preferred embodiment of the resolver system;
FIGURE 2 is a side view of the preferred embodiment illustrated in FIGURE 1;
FIGURE 3 is a side view of the unrolled reticle pattern utilized in the preferred embodiment;
FIGURE 4A shows the path of the flying spot of reflected light on the reticle when the axis of the spinning body is tilted toward the detector;
FIGURE 4B is a diagrammatical showing in graph form of the pulse emitted by the detector when the flying spot follows the path shown in FIGURE 4A;
FIGURE 5A shows the path of the flying spot of reflected light on the reticle when the axis of the spinning body is perpendicular to the plane of the light transmitted by the collecting and focussing lens;
FIGURE 5B is a diagrammatical showing in graph form of the pulse emitted by the detector when the flying spot follows the path shown in FIGURE 5A;
FIGURE 6A shows the path of the flying spot of reflected light on the reticle when the axis is tilted away from the detector;
FIGURE 6B is a diagrammatical showing in graph form of the pulse emitted by the detector when the flying spot follows the path shown in FIGURE 6A; and
FIGURE 7 is a diagrammatical showing of three alternative reticle planes, all of which are revolutions of circular segments about the spin axis.

The preferred embodiment of the invention is illustrated in greater detail in FIGURES 1, 2, and 3 of the drawing wherein a spinning body 10 is shown with the optical resolver system for measuring its axial pitch and yaw. Extending about the spinning body is a reticle area 12 which is divided into two equal zones 12' and 12". The reticle area of spinning body 10 is prepared by grinding the exterior surface of the body to a spherical shape of very close tolerance and subsequently lapping said body until it has an optical-grade finish. The maximum area desired for the reticle is then selected and divided into two equal generally triangular zones 12' and 12". Zone 12' has a high degree of reflectivity within the spectral range of the detector used and zone 12" has a very low degree of reflectivity within the same spectral range. The above mentioned grinding and lapping produces the desired degree of reflectivity for zone 12'. The low degree of reflectivity desired in zone 12" is realized or produced by dyeing, painting, or otherwise coloring that area with a substance that is black within the spectral range of the detector.

The optical resolver system comprises, in combination with reticle 12, a light source 11 within a housing 14 having pinhole apertures 14' and 14" for feeding light into both the pitch and yaw measuring systems. Light for measuring the axial pitch of the spinning body is emitted through aperture 14' into a 45° prism 16 which deflects the light rays through near diffraction limited lens 18 which focusses the light rays in the form of a flying spot onto reticle 12. The flying spot of light is reflected by the reticle with varying degrees of intensity depending upon whether the spot is on zone 12' or zone 12". The light reflected from the flying spot is collected and focussed by lens 20, which are a duplicate of lens 18, through a 45° prism 22 onto a pitch detector 24.

Light emitted through aperture 14" follows a path through a prism 26, a lens 28, onto reticle 12, through a lens 30, a prism 32, and onto a yaw detector 34 in a manner identical to the above described system for measuring the axial pitch of the spinning body. The only differences in the two systems consists in the points at which they contact reticle 12. It is preferred that these points of contact be 90° apart but their location depends upon the axial plane in which measurement is desired.

FIGURES 4A, 5A, and 6A illustrate three possible paths 36 that the flying spot of light may take about reticle 12 for two revolutions of the spinning body and FIGURES 4B, 5B, and 6B illustrate the type of pulse generated by the detector whenever the flying spot of light follows the several paths noted in FIGURES 4A, 5A, and 6A, point 38 being a positive pulse while point 40 is a negative pulse. The inset key in FIGURES 4B, 5B, and 6B show several angles of the spin axis either in the yaw or pitch planes to produce each pulse diagram.

Any type of photo-electric detector may be used in either the pitch or yaw measuring systems provided that it is sensitive to the light emitted by the pinhole source. However, it must have fast response if the change in light intensity reflected as the flying spot goes from the high reflecting zone to the low reflecting zone is to be accurately measured. At present, the detectors which seem to be most suitable from the standpoint of shock resistance, reliability, speed of response, and cost are lead sulfide and cadmium photo-electric cells. Cadmium sulfide is of especial interest because it has a high Q value (gain) in the visible spectral range where it is easy to select a black color for the low reflectivity zone of the reticle.

While the preferred embodiment of reticle described, supra, has been a cylindrical segment about the center of the spinning body as shown at 44 in FIGURE 7, it could readily be a convex disc segment 42 or an off-axis spherical segment 46, all of which segments extend about the spinning body. Obviously, the light focussing and detecting means will be adjusted to correspond to the reticle segment chosen.

The electronic circuitry for both angular and phase information should be quite simple. All that is necessary is to measure the ratio of the width of a positive or a negative pulse to that of a positive and a negative pulse. This information can then be correlated with a given angle. The phase information can be obtained at the onset of the positive pulse, and frequency can be found by comparing this information with a time base. The accuracy of this information will, of course, be less than that obtainable by increasing the sophistication of the electronic circuitry and by improving the reticle fabrication techniques.

Sample calculations of angular resolution as measured by the invention are set forth in the following example.

*Example*

Assumed parameters:
(1) Diameter of reticle surface: $3.000 \pm 0.00033/1$ inches.
(2) Reticle width: $1.25 \pm 0.00025$ inches for a look angle of $\pm 20°$.[1]
(3) Deviation of the line of demarcation from the ideal case; $\pm 0.00025$ inch.[2] The surface is assumed to be perfectly smooth.
(4) Error in time base: $\pm 0.0005\%$ for each revolution.

The output signal is differentiated before finding the ratios of the width of the positive pulse to that of a positive and negative pulse. It is assumed that the errors in the location of the cusps (electronic) are within $\pm 0/005\%$ of the calculated values. Accumulative errors:

$$(10.9 \times 10^{-8}) + (6.25 \times 10^{-8}) \pm (0.25)(0.25 \times 10^{-8})$$
$$+ 0.25 = \pm 4.2 \times 10^{-4}$$

Thus, assuming that a 1.0000 width=40°, we get an RMS accuracy of $\pm 1.68 \times 10^{-2}$ degree or $\pm 1$ minute of arc.

---
[1] This width is sufficient to allow a safety margin at either side.
[2] The error perpendicular to the axis of rotation is $\pm 0/0023$ inch; normalized (as a fraction of the circumference) this value becomes $\pm 0/00025$ inch.

It is to be understood that the form of the invention shown herein, while the preferred embodiment, is merely exemplary and that various changes in shape, size, and arrangement of elements may be resorted to without departing from either the spirit or the scope of the invention as defined by the following claims.

The invention claimed is:
1. Apparatus for measuring the pitch and yaw inclination of the spin-axis of a substantially spherical spinning body comprising, in combination,
   (a) a light source disposed within a housing,
   (b) said housing having first and second narrow apertures through which narrow beams of light rays generated by said source are emitted, each of said beams being emitted in a different direction,
   (c) a reticle surface girding the spinning body, said reticle surface defined by a circular segment of revolution about the spinning axis of said body, said zones having a generally triangular configuration disposed circumferentially on said body, said surface being divided into two zones of varying reflectivity and said reticle surface being disposed within the path of the said light beams whereby said light beams are reflected in a direction differing from said path, the intensity of said reflected light beams varying according to the zone of the reticle surface disposed within their paths,
   (d) a first optical means for directing and focussing the light beam emitted through the first aperture onto the reticle surface in the form of a first flying spot,
   (e) a second optical means for collecting and focussing said reflected light beam which emanated from said light source through said first aperture in said housing,
   (f) a first photo-electric detector disposed in the path of the light beam collected and focussed by said second optical means for detecting variations in the intensity of said light beam,
   (g) a third optical means for directing and focussing the light beam emitted through the second aperture onto the reticle surface in the form of a second flying spot, said second flying spot being circumferentially displaced from said first flying spot on said reticle surface,
   (h) a fourth optical means for collecting and focussing said reflected light beam which emanated from said light source through said second aperture in said housing, and
   (i) a second photo-electric detector disposed in the path of the light beam collected and focussed by said fourth optical means for detecting variations in the intensity of said light beam.

2. Apparatus as set forth in claim 1, wherein said first and second photo-electric detectors are cadmium sulfide detectors.

3. Apparatus as set forth in claim 1, wherein said first and second photo-electric detectors are lead sulfide detectors.

References Cited

UNITED STATES PATENTS

| | | | |
|---|---|---|---|
| 2,880,512 | 4/1959 | Fenemore et al. | 250—231 X |
| 2,959,060 | 11/1960 | Kunz | 74—5.6 |
| 2,991,659 | 7/1961 | Bowden | 74—5.6 |
| 3,097,299 | 7/1963 | Rasmussen | 74—5.6 X |
| 3,205,718 | 9/1965 | Wiernga et al. | 74—5.6 X |
| 3,270,567 | 9/1966 | Crampton | 74—5.6 |

OTHER REFERENCES

Bube: Photoconductivity of Solids, received Sc. Lib. Jan. 22, 1962, page 230.

RALPH G. NILSON, *Primary Examiner.*

J. D. WALL, *Assistant Examiner.*